United States Patent
Okano et al.

(10) Patent No.: US 11,177,949 B2
(45) Date of Patent: Nov. 16, 2021

(54) DATA SHARING METHOD, DATA SHARING SYSTEM, DATA SHARING SERVER, COMMUNICATION TERMINAL AND PROGRAM

(71) Applicant: NIPPON TELEGRAPH AND TELEPHONE CORPORATION, Chiyoda-ku (JP)

(72) Inventors: Yuki Okano, Musashino (JP); Reo Yoshida, Musashino (JP); Yuto Kawahara, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 107 days.

(21) Appl. No.: 16/638,356

(22) PCT Filed: Nov. 5, 2018

(86) PCT No.: PCT/JP2018/040951
§ 371 (c)(1),
(2) Date: Feb. 11, 2020

(87) PCT Pub. No.: WO2019/088279
PCT Pub. Date: May 9, 2019

(65) Prior Publication Data
US 2020/0374114 A1 Nov. 26, 2020

(30) Foreign Application Priority Data
Nov. 6, 2017 (JP) .............................. JP2017-213499

(51) Int. Cl.
*H04L 9/08* (2006.01)
*H04L 29/06* (2006.01)

(52) U.S. Cl.
CPC .......... *H04L 9/0866* (2013.01); *H04L 9/0819* (2013.01); *H04L 9/0891* (2013.01); *H04L 63/0428* (2013.01)

(58) Field of Classification Search
CPC ... H04L 9/0866; H04L 9/0819; H04L 9/0891; H04L 63/0428; H04L 9/3073;
(Continued)

(56) References Cited

U.S. PATENT DOCUMENTS 6,215,877 B1 * 4/2001 Matsumoto ........... H04L 9/0825
380/277
6,775,382 B1 * 8/2004 Al-Salqan ............. H04L 9/0894
380/280
(Continued)

FOREIGN PATENT DOCUMENTS

CN 107566324 A * 1/2018

OTHER PUBLICATIONS

Tsu-Yang Wu, et al., "A revocable ID-based authenticated group key exchange protocol with resistant to malicious participants," Computer Networks, vol. 56, XP028400816, 2012, pp. 2994-3006.
(Continued)

*Primary Examiner* — Shahriar Zarrineh
(74) *Attorney, Agent, or Firm* — Oblon, McClelland, Maier & Neustadt, L.L.P.

(57) ABSTRACT

There is provided a data sharing technique in which it is possible to update data stored in a server before to such data that is decryptable on the communication terminal side using an updated session key without the data being decrypted on the server side, and a deleted user cannot decrypt the decryptable data. There are included: a generation identifier generation step of a data sharing server generating a generation identifier showing a generation of a group; a session key encryption step of a communication terminal to perform
(Continued)

encrypted session key update using the generation identifier received from the data sharing server and a public parameter and a session key recorded in a recording part to generate an encrypted session key, which is a session key encrypted; and an encrypted session key management step of the data sharing server recording the encrypted session key received from the communication terminal to perform encrypted session key update as a currently valid encrypted session key.

4 Claims, 6 Drawing Sheets

(58) Field of Classification Search
CPC ... H04L 9/0861; H04L 9/0825; H04L 63/065; H04L 9/0833; H04L 9/16
See application file for complete search history.

(56) References Cited

U.S. PATENT DOCUMENTS

| | | | | |
|---|---|---|---|---|
| 6,819,766 | B1* | 11/2004 | Weidong | H04L 9/088 380/277 |
| 7,089,211 | B1* | 8/2006 | Trostle | H04L 9/0833 705/51 |
| 8,301,879 | B2* | 10/2012 | Ramanathan | H04L 12/1822 713/156 |
| 8,306,229 | B2* | 11/2012 | Pang | H04W 12/0433 380/278 |
| 8,588,423 | B2* | 11/2013 | Pang | H04L 9/0844 380/279 |
| 9,225,516 | B1* | 12/2015 | O'Connor | H04L 9/3271 |
| 2003/0046539 | A1* | 3/2003 | Negawa | H04L 9/0822 713/163 |
| 2003/0070067 | A1* | 4/2003 | Saito | H04L 9/0844 713/150 |
| 2003/0163697 | A1* | 8/2003 | Pabla | H04L 9/0891 713/171 |
| 2005/0160269 | A1* | 7/2005 | Akimoto | H04L 63/0435 713/171 |
| 2006/0129818 | A1* | 6/2006 | Kim | H04L 63/0442 713/171 |
| 2007/0219915 | A1* | 9/2007 | Hatano | H04L 9/083 705/57 |
| 2007/0248232 | A1* | 10/2007 | Driscoll | H04L 9/083 380/280 |
| 2008/0130902 | A1* | 6/2008 | Kune | H04L 9/0838 380/286 |
| 2009/0296924 | A1* | 12/2009 | Oksman | H04L 9/0841 380/30 |
| 2010/0293379 | A1* | 11/2010 | Nie | H04W 12/10 713/169 |
| 2013/0268357 | A1* | 10/2013 | Heath | G06Q 30/02 705/14.53 |
| 2015/0312260 | A1* | 10/2015 | Kim | H04L 51/32 713/152 |
| 2017/0012950 | A1* | 1/2017 | Kim | H04L 9/0891 |
| 2017/0111357 | A1* | 4/2017 | Unagami | H04L 9/3263 |
| 2017/0149748 | A1* | 5/2017 | Lindteigen | H04L 67/141 |
| 2018/0123784 | A1* | 5/2018 | Gehrmann | H04L 9/0891 |
| 2018/0198610 | A1* | 7/2018 | Mullins | H04L 9/0861 |
| 2018/0198627 | A1* | 7/2018 | Mullins | H04L 9/0877 |
| 2019/0124058 | A1* | 4/2019 | Kawahara | H04W 12/0431 |
| 2019/0215158 | A1* | 7/2019 | Okano | H04L 63/0428 |

OTHER PUBLICATIONS

Amandeep Thukral, et al., "Secure Group Instant Messaging Using Cryptographic Primitives," ICCNMC 2005, LNCS, vol. 3619, XP019016420, 2005, pp. 1002-1011.
Nik Unger, et al., "SoK: Secure Messaging," 2015 IEEE Symposium on Security and Privacy, XP055815954, 2015, 25 pages.
International Search Report dated Jan. 15, 2019 in PCT/JP2018/040951 filed on Nov. 5, 2018, 2 pages.
"TopicRoom: group chat for business," [online], searched on Oct. 16, 2017, https://www.ntt-tx.co.jp/products/topicroom/, 5 total pages (with partial English translation).
Kobayashi, T. et al., "Scalable and Dynamic Multi-Cast Key Distribution," Proceedings of SCIS 2016 Symposium on Cryptography and Information Security, The Institute of Electronics, Information and Communication Engineers, 4E2-3, 2016, pp. 1-7.
Moriyama, D. et al., "Mathematics of Public Key Cryptography," Kyoritsu Shuppan Co., Ltd., 2011, 2 total pages (with partial English translation).
Yoneyama, K. et al., "Multi-Cast Key Distribution: Scalable, Dynamic and Provably Secure Construction," Cryptology ePrint Archive, Report 2016/833, 2016, http://eprint.iacr.org/2016/833, 28 total pages.

* cited by examiner ns, 4E2-3, 2016.
DATA SHARING METHOD, DATA SHARING SYSTEM, DATA SHARING SERVER, COMMUNICATION TERMINAL AND PROGRAM

TECHNICAL FIELD

This invention relates to application of information security technology, and in particular to data sharing technology for a plurality of users forming a group to share data.

BACKGROUND ART

As data sharing systems intended for business use, systems compatible with multi-devices such as a personal computer and a smartphone exist. Among the systems compatible with multi-devices, cloud-based data sharing systems that do not leave data in communication terminals in consideration of leakage of confidential information of companies exist. As an example of cloud-based message transmission systems, the system of Non-patent literature 1 is given.

In such a data sharing system, wiretapping on a communication path is prevented by encrypting the communication path, or information leakage due to lost or illegal taking-out of a communication terminal is prevented by not leaving data in the communication terminal as already stated. Thus, though a conventional data sharing system copes with threats against "communication paths" and "communication terminals", it does not sufficiently cope with threats against a server.

As the threats against a server, "attacks from the outside of the server", "internal frauds by a server administrator or the like" are given. To cope with these attacks, a countermeasure of encrypting and storing data to be shared is conceivable. However, as far as the data is decryptable on the server side, the possibility of data leakage from the server still exists in terms of the threats stated before. It is important that data sent to a server that performs transmission, reception and storage is concealed from the server (the data is not wiretapped on the server side).

As one method, it is conceivable to realize end-to-end encrypted communication in which data is concealed from a server and is decryptable only on communication terminals. In this case, it is a problem how a common key used among the communication terminals is shared. As a solution for this problem, for example, Non-patent literature 2 is disclosed. Non-patent literature 2 proposes a protocol to share a key (hereinafter referred to as a session key) among users in a star network having an authentication server in the center, without leaking any information to the authentication server.

Thereby, it is possible to exchange data among the communication terminals while concealing the data to from server. Further, since sharing of the session key is performed such that data can be read only on currently participating communication terminals, the session key is updated by an event such as addition or deletion of a user.

PRIOR ART LITERATURE

Non-Patent Literature

Non-patent literature 1: "TopicRoom: group chat for business", [online], [searched on Oct. 16, 2017], the Internet <URL: https://www.ntt-tx.co.jp/products/topicroom/>
Non-patent literature 2: Tetsutaro Kobayashi, Kazuki Yoneyama, Reo Yoshida, Yuto Kawahara, Hitoshi Fuji, Tomohide Yamamoto, "Scalable and Dynamic Multi-Cast Key Distribution", Proceedings of SCIS2016-Symposium on Cryptography and Information Security, The Institute of Electronics, Information and Communication Engineers, 4E2-3, 2016.

SUMMARY OF THE INVENTION

Problems to be Solved by the Invention

According to the technique of Non-patent literature 2 described above, it is possible to exchange data while concealing the data from a server, by sharing a key among communication terminals such that it is not known to the server.

However, since a session key is shared only among currently participating members in Non-patent literature 2, the session key is updated accompanying addition/deletion of a user such as a login/logout event and, additionally, the session key may be periodically updated. Therefore, there is a problem that, in order to enable only currently participating communication terminals to read data accumulated in the past, the data must be updated to such data that is decryptable on the communication terminal side using an updated session key without the data stored in a server before being decrypted on the server side. Therefore, in practical use, it is difficult to apply the protocol to a cloud-based data sharing system as it is.

Further, it is necessary to make a deleted user unable to read the above decryptable data.

Therefore, an object of the present invention is to provide a data sharing technique in which it is possible to update data stored in a server before to such data that is decryptable on the communication terminal side using an updated session key without the data being decrypted on the server side, and a deleted user cannot decrypt the decryptable data.

Means to Solve the Problems

An aspect of the present invention is a data sharing method for, in a data sharing system comprising n communication terminals (n is an integer equal to or larger than 1) sharing data, a data sharing server recording encrypted data obtained by encrypting the data and a key generation server generating a public parameter, updating an encrypted session key obtained by encrypting a session key shared among the communication terminals sharing the data when a user using any of the n communication terminals leaves a group composed of users using the n communication terminals, in order that the user who has left the group cannot decrypt the encrypted data, wherein any of n−1 communication terminals except the communication terminal used by the user who has left the group is used as a communication terminal to perform encrypted session key update; in a recording part of the communication terminal to perform encrypted session key update, the public parameter and a currently valid session key are recorded; and the data sharing method comprises: a generation identifier generation step of the data sharing server generating a generation identifier showing a generation of the group; a session key encryption step of the communication terminal to perform encrypted session key update using the generation identifier received from the data sharing server and the public parameter and the session key recorded in the recording part to generate an encrypted session key, which is the session key that has been encrypted; and an encrypted session key management step of the data sharing server recording the encrypted session key received from the communication terminal to perform encrypted session key update as a currently valid encrypted session key.

Effects of the Invention

According to this invention, a user deleted from a group performing data sharing cannot decrypt data decryptable on the communication terminal side, which is data stored in a server before and has been updated using an updated session key without being decrypted on the server side.

DETAILED DESCRIPTION OF THE EMBODIMENT

Figure 1:
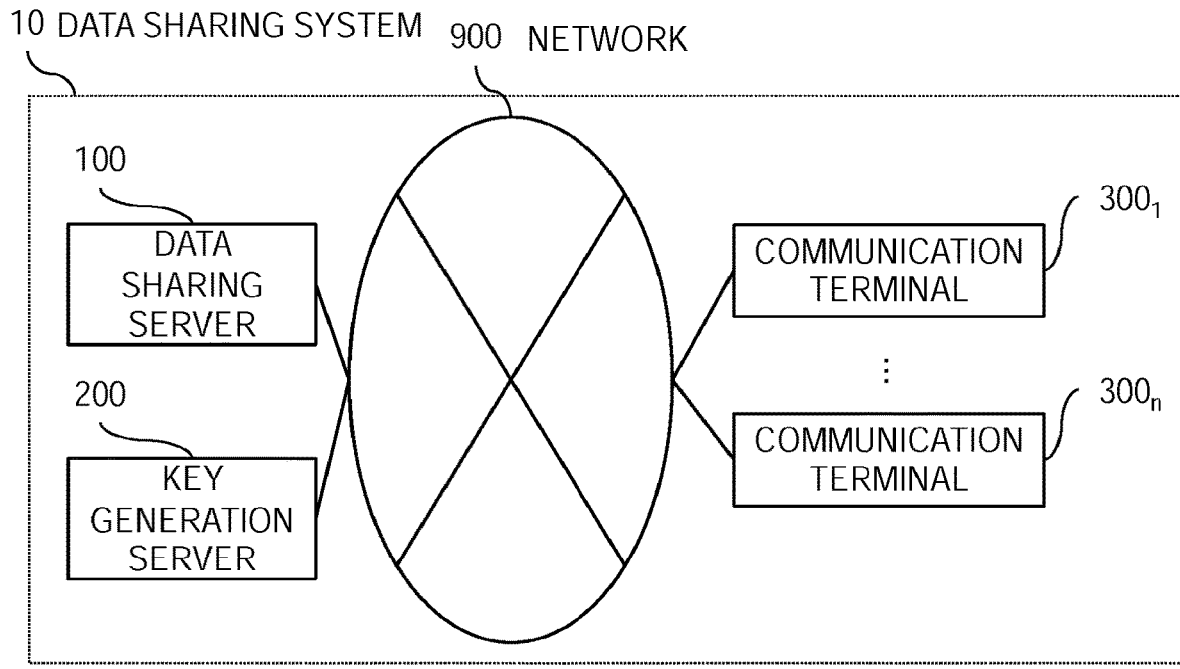
FIG. 1 is a diagram showing an example of a configuration of a data sharing system 10.

An embodiment of the present invention will be described below in detail. Components having the same functions will be given the same reference numerals, and duplicated description will be omitted.

Definitions

It is assumed that N is a set of all positive integers.

An ID-based encryption system is configured with the following four algorithms (Setup, Keygen, Enc and Dec). Here, Setup, Keygen, Enc and Dec are algorithms having the following inputs and outputs. Here, $k \in N$ is assumed to be a security parameter.

[Setup($1^k$)→(params, msk)]

Setup is an algorithm to output a public parameter params and a master secret key msk, with the security parameter k as an input.

[Keygen(params, msk, ID)→$d_{ID}$]

Keygen is an algorithm to output a secret key $d_{ID}$ for an identifier ID, with the public parameter params, the master secret key msk and the identifier ID as an input.

[Enc(params, ID, m)→C]

Enc is an algorithm to output cryptograph C, with the public parameter params, the identifier ID and plaintext m as an input.

[Dec(params, $d_{ID}$, C)→m']

Dec is an algorithm to output plaintext m', with the public parameter params, the secret key $d_{ID}$ and the cryptograph C as an input.

Furthermore, it is assumed that the above algorithms satisfy the following condition.

(Condition) For an arbitrary security parameter k, an arbitrary set of a public parameter and a master secret key (params, msk) outputted by Setup($1^k$), a secret key $d_{ID}$ outputted by Keygen(params, msk, ID) for an arbitrary identifier ID, and arbitrary plaintext m, Dec(params, $d_{ID}$, Enc(params, ID, m))=m is satisfied.

An example of such an ID-based encryption system is described, for example, in Reference non-patent literature 1.
(Reference non-patent literature 1: Daisuke Moriyama, Ryo Nishimaki, Tatsuaki Okamoto, "Mathematics of Public Key Cryptography", KYORITSU SHUPPAN CO., LTD., 2011.)

Here, $k1 \in N$ is assumed, and it is assumed that a key space with k1-bit length is KEY={0, 1}$^{k1}$. It is assumed that, for a function $f_{k1}$:KEY×KEY→KEY, a function $h_{k1}$:KEY×KEY→KEY and a function $g_{k1}$:KEY×KEY→KEY that satisfy the following conditions (a) and (b) exist.

(Condition (a)) For arbitrary K,K'∈KEY, the function $h_{k1}$:KEY×KEY→KEY satisfies the following formula.

$$h_{k1}(f_{k1}(K,K'),K')=K \qquad \text{[Formula 1]}$$

(Condition (b)) For arbitrary K,K',K''∈KEY, the function $g_{k1}$:KEY×KEY→KEY satisfies the following formula.

$$g_{k1}(f_{k1}(K,K'),f_{k1}(K',K''))=f_{k1}(K,K'') \qquad \text{[Formula 2]}$$

As sets of such functions ($f_{k1}$, $g_{k1}$, $h_{k1}$), for example, ($f_{k1}$, $g_{k1}$, $h_{k1}$)=(((x1, x2)→x1−x2), ((y1, y2)→y1+y2), ((z1, z2)→z1+z2)) and ($f_{k1}$, $g_{k1}$, $h_{k1}$)=(((x1, x2)→x1/x2), ((y1, y2)→y1·y2), ((z1, z2)→z1·z2)) are given. Note that the operation − of x1−x2 means a difference in an additive group when a key space includes a structure as the additive group. The operation / of x1/x2 means a quotient in a multiplicative group when a key space includes a structure as the multiplicative group.

First Embodiment

[System Configuration]

A data sharing system 10 will be described below with reference to FIG. 1. FIG. 1 is a diagram showing an example of a configuration of the data sharing system 10. The data sharing system 10 includes a data sharing server 100, a key generation server 200 and communication terminals 300$_1$, ..., 300$_n$ (n≥1).

The data sharing server 100, the key generation server 200 and the communication terminals 300$_1$, ..., 300$_n$ connect to a network 900 such as the Internet and are mutually communicable. However, it is preferable to make a configuration such that the data sharing server 100 and the key generation server 200 do not directly communicate with each other.

The data sharing system 10 is a system for the n communication terminals 300$_1$, ..., 300$_n$ to share data. When a communication terminal 300$_i$ (1≤i≤n) shares data with another communication terminal 300$_j$ (1≤j≤n), encrypted data, which is the data to be shared that has been encrypted, is generated and shared via the data sharing server 100.

The data sharing server 100 records the encrypted data transmitted from the communication terminal 300$_i$ and transmits the encrypted data to the other communication terminal 300$_j$. The key generation server 200 generates a public parameter, a master secret key and a secret key which are information required for encryption/decryption of a session key described later. The ID-based encryption system is used to generate the public parameter, the master secret key and the secret key.

Persons who share data using the communication terminals 300 are referred to as users. The users form groups for sharing data. Each group is given a group identifier. For example, it is assumed that users of the communication terminals $300_1$, $300_2$, $300_3$, and $300_4$ are users A, B, C and D, respectively, and that the users A, B, C and D belong to a group having a group identifier groupID. Each of the communication terminals 300 may be any terminal, such as a personal computer or a smartphone, if the terminal has a communication function the users can use.

Each user shares a session key with other users using a communication terminal 300. The session key is generated for each group, and it is a key shared only among communication terminals 300 used by users belonging to the group. Note that it is assumed that the session key is shared in such a form that any information about the session key is never leaked to apparatuses other than the communication terminals 300, such as the data sharing server 100 and the key generation server 200. As a method for such sharing, for example, a protocol described in Reference non-patent literature 2 is given. However, the session key sharing method is not limited to the protocol described in Reference non-patent literature 2. A session key may be shared using any method.

(Reference non-patent literature 2: K. Yoneyama, R. Yoshida, Y. Kawahara, T. Kobayashi, H. Fuji, and T. Yamamoto, "Multi-Cast Key Distribution: Scalable, Dynamic and Provably Secure Construction", Cryptology ePrint Archive, Report 2016/833, http://eprint.iacr.org/2016/833, 2016.)

It is assumed that, in order to secure security of a session key, a new session key is generated when a predetermined event occurs, for example, a new user being added to a group, a user leaving (being deleted from) the group, or the like, or when a predetermined time has elapsed. Further, a session key may be generated such that an available period of the session key is a period during which at least one user is logged in. That is, a session key may be generated when the first user is logged in, and the session key may be discarded when all users are logged out.

Figure 2:
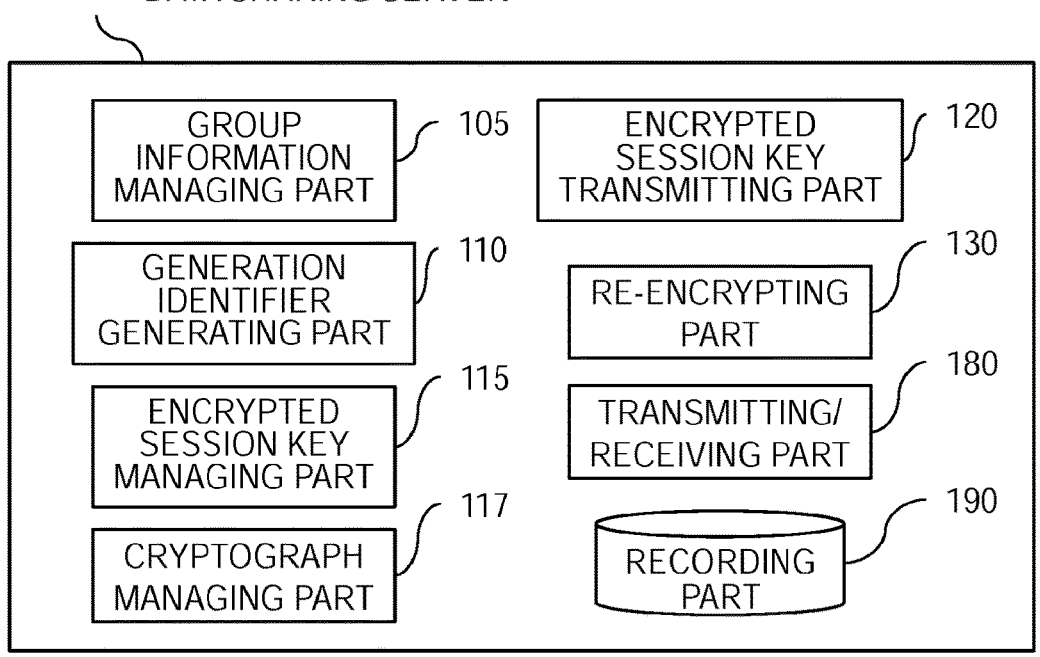
FIG. 2 is a block diagram showing an example of a configuration of a data sharing server 100.

Next, each of the data sharing server 100, the key generation server 200 and the communication terminals 300 will be described with reference to FIGS. 2 to 4. FIG. 2 is a block diagram showing an example of a configuration of the data sharing server 100. The data sharing server 100 includes a group information managing part 105, a generation identifier generating part 110, an encrypted session key managing part 115, a cryptograph managing part 117, an encrypted session key transmitting part 120, a re-encrypting part 130, a transmitting/receiving part 180 and a recording part 190. The transmitting/receiving part 180 is a component for appropriately transmitting/receiving information that the data sharing server 100 has to exchange with other apparatuses. The recording part 190 is a component that appropriately records information required for processing of the data sharing server 100. For example, the recording part 190 records encrypted data.

Figure 3:
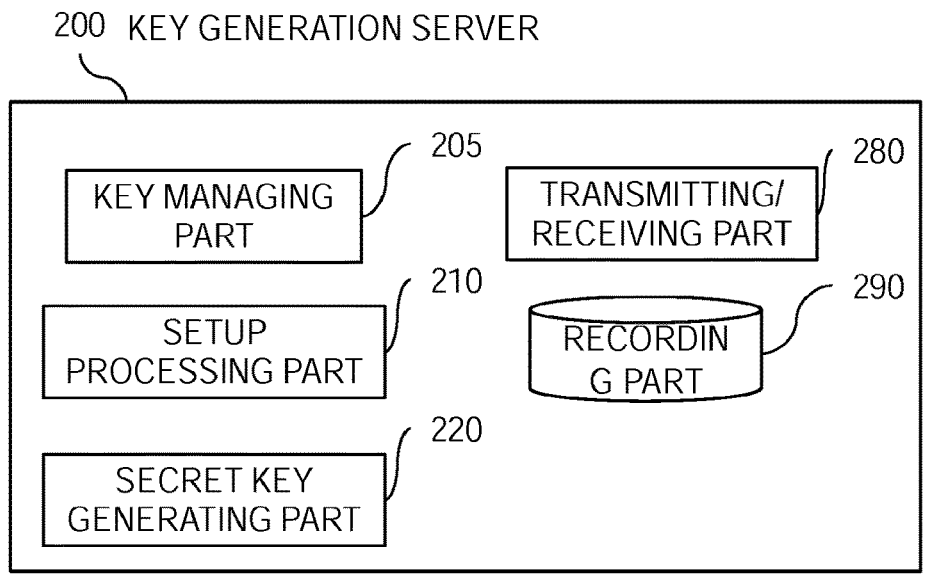
FIG. 3 is a block diagram showing an example of a configuration of a key generation server 200.

FIG. 3 is a block diagram showing an example of a configuration of the key generation server 200. The key generation server 200 includes a key managing part 205, a setup processing part 210, a secret key generating part 220, a transmitting/receiving part 280 and a recording part 290. The transmitting/receiving part 280 is a component for appropriately transmitting/receiving information that the key generation server 200 has to exchange with other apparatuses. The recording part 290 is a component that appropriately records information required for processing of the key generation server 200. For example, the recording part 290 records a public parameter and a master secret key.

Figure 4:
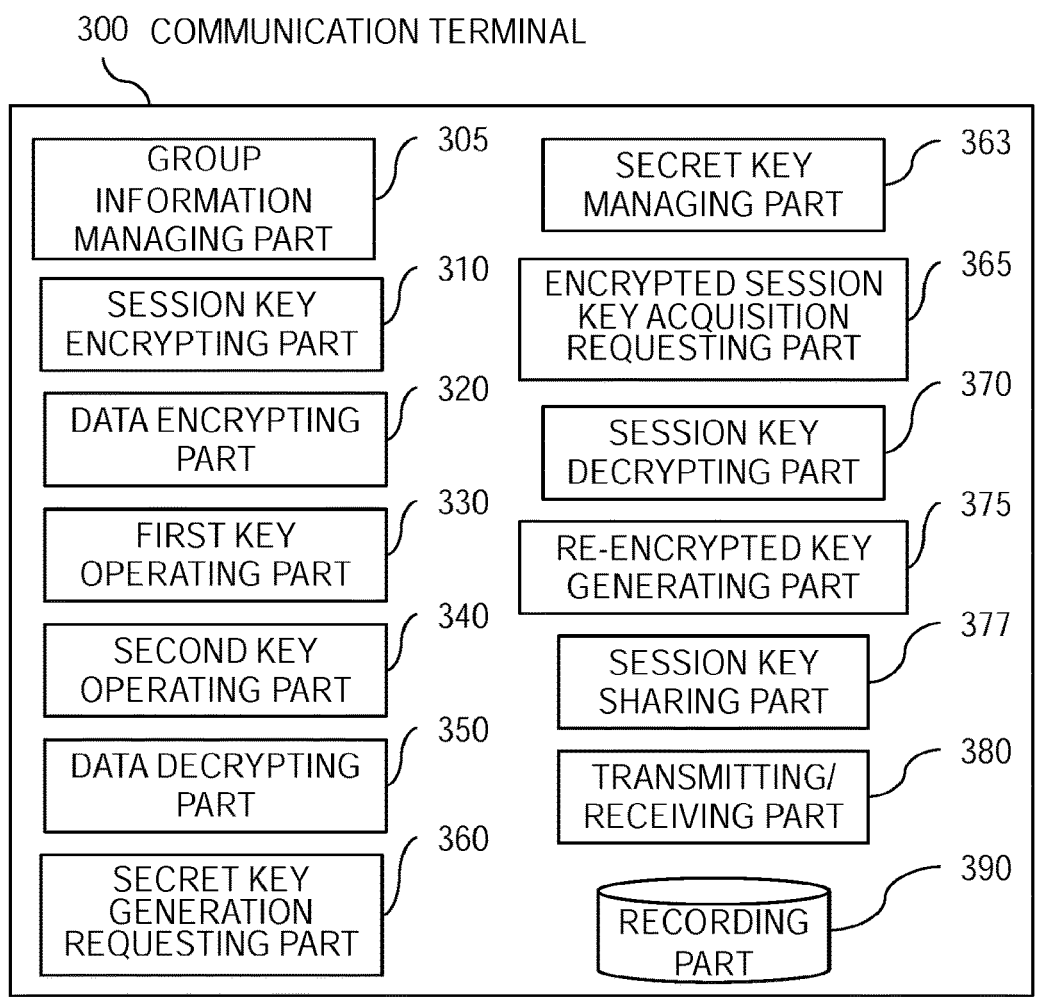
FIG. 4 is a block diagram showing an example of a configuration of a communication terminal 300.

FIG. 4 is a block diagram showing an example of a configuration of each communication terminal 300. The communication terminal 300 includes a group information managing part 305, a session key encrypting part 310, a data encrypting part 320, a first key operating part 330, a second key operating part 340, a data decrypting part 350, a secret key generation requesting part 360, a secret key managing part 363, an encrypted session key acquisition requesting part 365, a session key decrypting part 370, a re-encrypted key generating part 375, a session key sharing part 377, a transmitting/receiving part 380 and a recording part 390. The transmitting/receiving part 380 is a component for appropriately transmitting/receiving information that the communication terminal 300 has to exchange with other apparatuses. The recording part 390 is a component that appropriately records information required for processing of the communication terminal 300. For example, the recording part 390 records a group identifier.

Description will be made below on data sharing in the group the members of which are the users A, B, C and D of the communication terminals $300_1$, $300_2$, $300_3$, and $300_4$ described before as an example.

[System Setup]

The group information managing part 105 of the data sharing server 100 generates the group identifier groupID for the group the members of which are the users A, B, C and D of the communication terminals $300_1$, $300_2$, $300_3$ and $300_4$ and records the group identifier groupID to the recording part 190. It is assumed that, by the group information managing part 105 recording user identifiers of the users A, B, C and D composing the group having the group identifier groupID to the recording part 190 together with the group identifier groupID, the data sharing server 100 generally manages information about the group. Therefore, the data sharing server 100 can grasp the users currently belonging to the group.

The data sharing server 100 transmits the group identifier groupID to the communication terminals $300_1$, $300_2$, $300_3$ and $300_4$ using the transmitting/receiving part 180, and the group information managing part 305 of each communication terminal 300 records the group identifier groupID to the recording part 390.

The process about the group identifier described above is not limited to the above method. Any processing method is possible if the group identifier groupID is recorded to each of recording parts of the data sharing server 100 and the communication terminals $300_1$, $300_2$, $300_3$ and $300_4$.

The setup processing part 210 of the key generation server 200 generates the public parameter params and the master secret key msk by the algorithm Setup($1^k$), with a predetermined security parameter k∈N (for example, a key length) as an input, and the key managing part 205 of the key generation server 200 records a set of the public parameter and the master key (params, mask) to the recording part 290.

Since the public parameter params is information used by the communication terminals 300, it is assumed that the public parameter params is transmitted from the key generation server 200 to a communication terminal 300 at a timing when a user logs in the data sharing system 10. The communication terminal 300 records the public parameter params to the recording part 390. Since the master secret key is information concealed from apparatuses other than the key generation server 200, it is assumed that the key generation server 200 records the master secret key msk to the recording part 290 in secret.

The process about the public parameter and the master secret key is not limited to the above method. Any processing method is possible if the set of the public parameter and the master key (params, msk) is recorded to the recording part 290 of the key generation server 200, and the public parameter params is recorded to the recording parts 390 of the communication terminals $300_1$, $300_2$, $300_3$ and $300_4$.

[Generation Identifier Generation Process]

A group identifier is an identifier used in the data sharing system 10 until a certain group disappears (for example, until the number of members becomes zero) after the group is generated. Separately from this group identifier, the data sharing system 10 also uses an identifier generated each time the composition of members of the group changes (hereinafter referred to as a generation identifier). That is, the generation identifier can be said to be an identifier showing a generation of a group. Here, a generation identifier generation process will be described.

Figure 5:
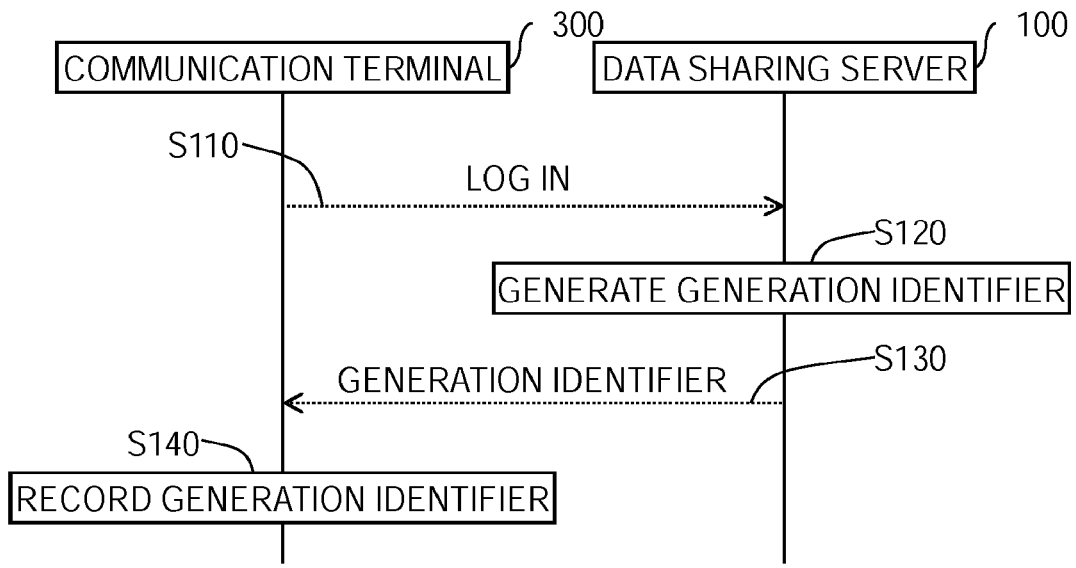
FIG. 5 is a sequence diagram showing an example of a generation identifier generation process.

The first timing to generate the generation identifier is, for example, the timing when one of the users composing the group having the group identifier groupID (for example, the user A) logs in the data sharing system 10 first after the group identifier groupID is generated. That is, the communication terminal $300_1$ is a communication terminal to receive the generation identifier. The generation identifier generation process will be described below with reference to FIG. 5.

When the user A logs in the data sharing system 10 using the communication terminal $300_1$ (S110), the generation identifier generating part 110 of the data sharing server 100 generates a generation identifier gID (S120). It is assumed that the generation identifier gID is a character string groupID∥gen-time obtained by coupling the group identifier groupID and time gen-time when the generation is formed (for example, login time). The generation identifier is not limited thereto. For example, a random number is also possible. The group information managing part 105 of the data sharing server 100 records the generated generation identifier gID to the recording part 190. That is, the data sharing server 100 also manages a generation identifier together with a group identifier and user identifiers of users composing a group.

The data sharing server 100 transmits the generation identifier gID generated at S120 to the communication terminal $300_1$ using the transmitting/receiving part 180 (S130).

When the communication terminal $300_1$ receives the generation identifier gID using the transmitting/receiving part 380, the group information managing part 305 of the communication terminal $300_1$ records the generation identifier gID to the recording part 390 (S140). It is assumed that this generation identifier gID is transmitted when a user other than the user A (the user B, C or D) constituting the group having the group identifier groupID logs in the data sharing system 10 using a communication terminal 300, from the data sharing server 100 to the communication terminal 300, and the communication terminal 300 records the received generation identifier gID to the recording part 390.

[Session Key Encryption Process]

Figure 6:
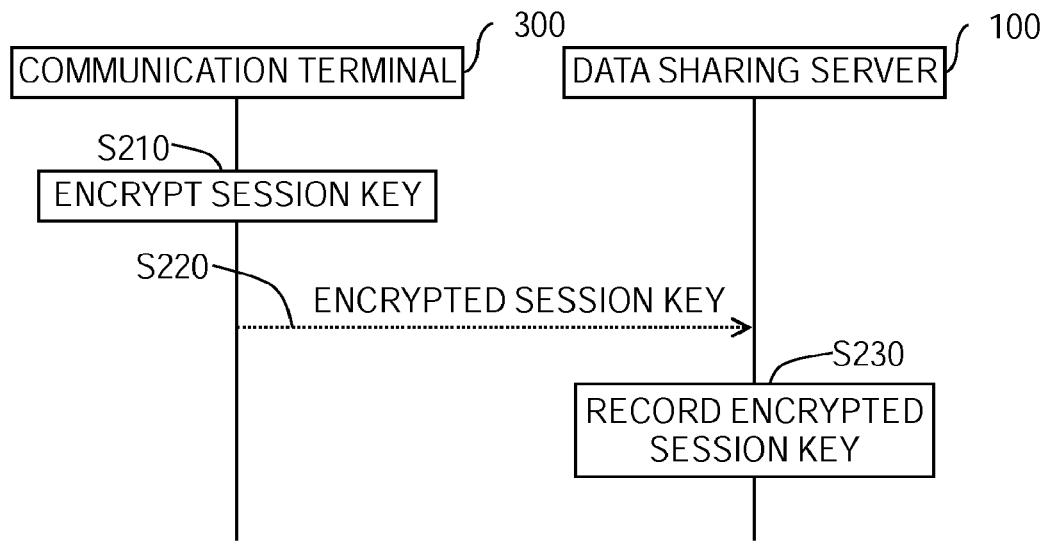
FIG. 6 is a sequence diagram showing an example of a session key encryption process.

As described above, the session key is appropriately updated to secure security. Description will be made below on a session key encryption process for encrypting a currently valid session key and recording the currently valid session key to the data sharing server 100 with reference to FIG. 6. It is assumed that a communication terminal 300 to encrypt the currently valid session key is, for example, the communication terminal $300_2$ of the user B who is currently logged in the data sharing system 10. That is, the communication terminal $300_2$ is the communication terminal to encrypt the session key. Further, it is assumed that the currently valid session key is SK. It is assumed that the session key SK is generated by the session key sharing parts 377 of the communication terminals $300_1$, $300_2$, $300_3$ and $300_4$ and recorded to the recording parts 390 of the communication terminals $300_1$, $300_2$, $300_3$ and $300_4$.

The session key encrypting part 310 of the communication terminal $300_2$ generates an encrypted session key $C_{SK}$, which is the session key SK that has been encrypted, by the algorithm Enc(params, gID, SK), with the public parameter params, the generation identifier gID and the session key SK recorded in the recording part 390 as an input (S210).

The communication terminal $300_2$ transmits the encrypted session key $C_{SK}$ generated at S210 to the data sharing server 100 using the transmitting/receiving part 380 (S220).

When the data sharing server 100 receives the encrypted session key $C_{SK}$ using the transmitting/receiving part 180, the encrypted session key managing part 115 of the data sharing server 100 records the encrypted session key $C_{SK}$ to the recording part 190 (S230).

[Data Sharing Process]

Figure 7:
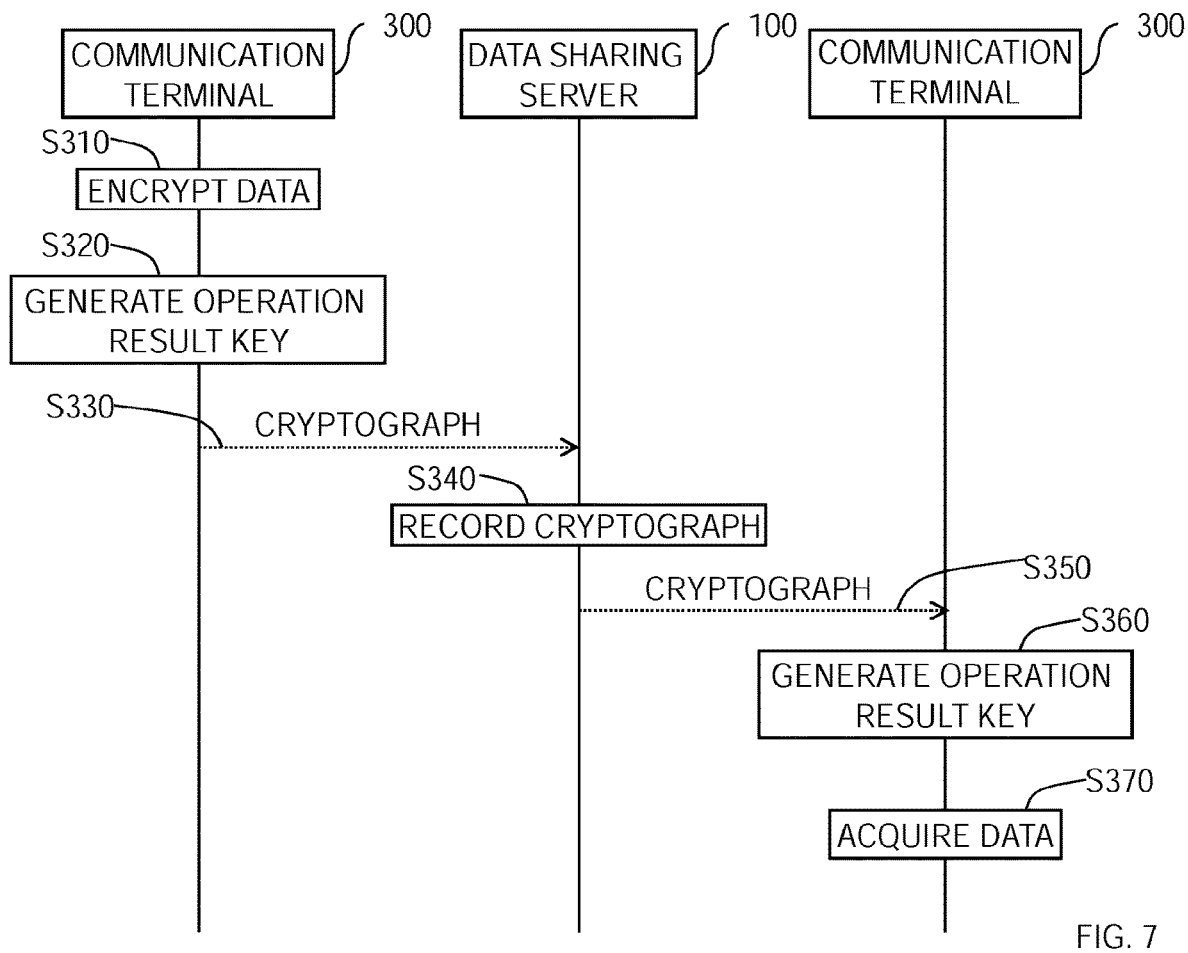
FIG. 7 is a sequence diagram showing an example of a data sharing process.

It is assumed that the generation identifier gID and the session key SK are shared among the communication terminals $300_1$, $300_2$, $300_3$ and $300_4$. That is, the generation identifier gID and the session key SK are recorded in the recording part 390 of each communication terminal 300. A data sharing process for a communication terminal 300 to share data with another communication terminal 300 will be described below with reference to FIG. 7. Here, it is assumed that the communication terminal 300 to be a transmission source is the communication terminal $300_3$, and the communication terminal 300 to be a transmission destination is the communication terminal $300_4$. That is, the communication terminal $300_3$ is a communication terminal that transmits data to be shared, and the communication terminal $300_4$ is a communication terminal that receives the data to be shared.

The communication terminal $300_3$ to be the transmission source generates a common key K used for encryption of the data to be shared beforehand and records the common key K to the recording part 390. The common key K may be, for example, a random number.

The data encrypting part 320 of the communication terminal $300_3$ encrypts the data in to be shared using the common key K recorded in the recording part 390 to generate encrypted data $C_m$ (S310).

The first key operating part 330 of the communication terminal $300_3$ generates an operation result key $f_{k1}(K, SK)$ by the function $f_{k1}$ from the session key SK recorded in the recording part 390 and the common key K used for the encryption at S310 (S320).

The communication terminal $300_3$ transmits cryptograph $(C_m, f_{k1}(K, SK))$, which is a set of the encrypted data $C_m$ generated at S310 and the operation result key $f_{k1}(K, SK)$ generated at S320, to the data sharing server 100 using the transmitting/receiving part 380 (S330). At this time, information about the communication terminal $300_4$ to be the transmission destination (for example, an IP address of the communication terminal $300_4$) is specified and transmitted to the data sharing server 100 together.

When the data sharing server 100 receives the cryptograph $(C_m, f_{k1}(K, SK))$ using the transmitting/receiving part 180, the cryptograph managing part 117 of the data sharing server 100 records the cryptograph $(C_m, f_{k1}(K, SK))$ to the recording part 190 (S340). At this time, the data sharing server 100 also receives the information about the communication terminal $300_4$ to be the transmission destination together.

The data sharing server 100 transmits the cryptograph ($C_m$, $f_{k1}$(K, SK)) received at S340 to the communication terminal $300_4$ specified as the transmission destination using the transmitting/receiving part 180 (S350).

When the communication terminal $300_4$ specified as the transmission destination receives the cryptograph ($C_m$, $f_{k1}$(k, SK)) using the transmitting/receiving part 380, the second key operating part 340 of the communication terminal $300_4$ generates an operation result key $h_{k1}(f_{k1}(K, SK), SK)$ by the function $h_{k1}$ from $f_{k1}$(K, SK), which is an element of the cryptograph, and the session key SK recorded in the recording part 390 (S360). Here, since $h_{k1}(f_{k1}(K, SK), SK)=K$ is satisfied, the communication terminal $300_4$ obtains the common key K.

The data decrypting part 350 of the communication terminal $300_4$ decrypts $C_m$, which is an element of the cryptograph, using the common key K which is the operation result key $h_{k1}(f_{k1}(K, SK), SK)$ generated at S360 to obtain the data in (S370).

[Re-Encryption Process]

Figure 8:
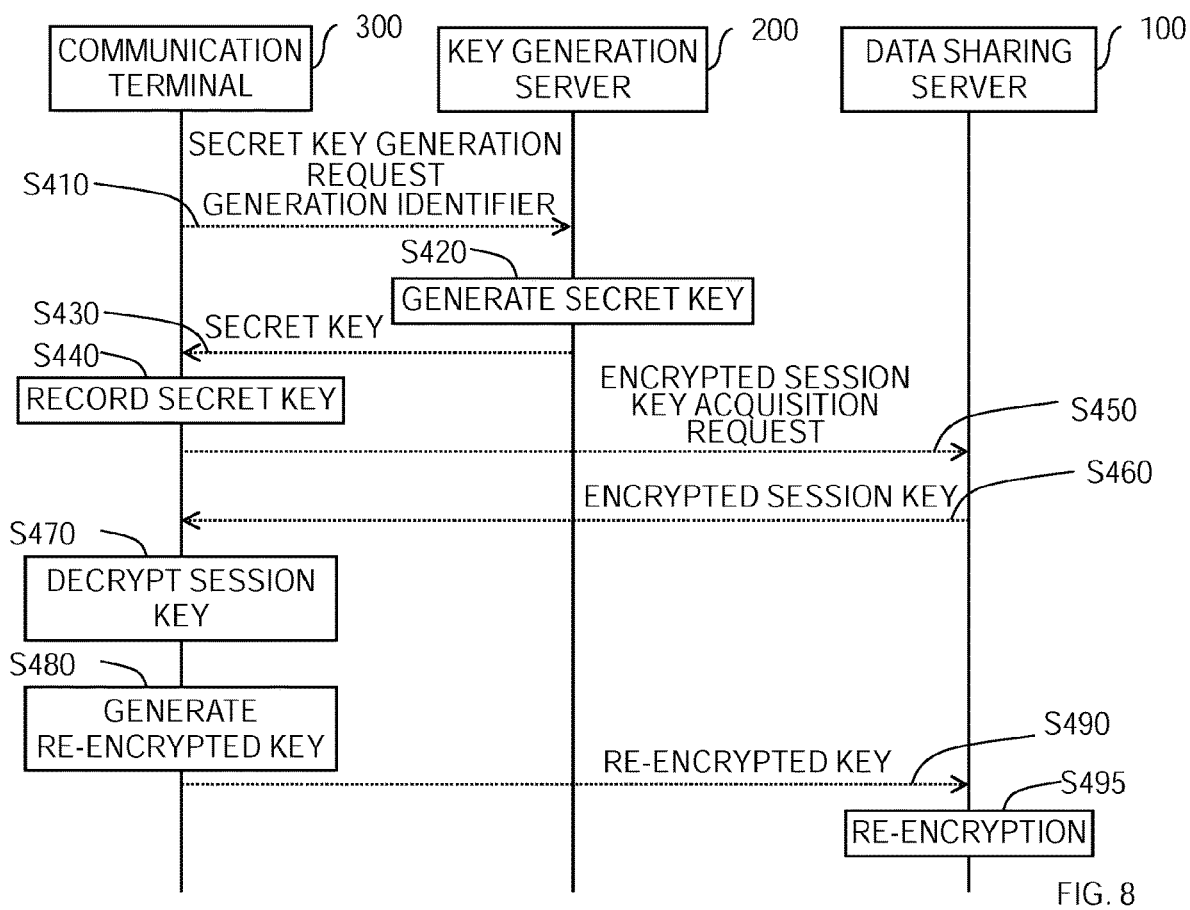
FIG. 8 is a sequence diagram showing an example of a re-encryption process.

A re-encryption process of cryptograph in the data sharing server 100 accompanying update of a session key will be described below with reference to FIG. 8. The encrypted session key $C_{SK}$ is recorded in the recording part 190 of the data sharing server 100. The generation identifier gID is recorded in the recording parts 390 of the communication terminals $300_1$, $300_2$, $300_3$ and $300_4$. It is assumed that the communication terminals $300_1$, $300_2$, $300_3$ and $300_4$ have generated and shared a new session key SK' using the session key sharing parts 377. It is assumed that a communication terminal 300 to generate a re-encryption key, which is a key for re-encrypting cryptograph, is the communication terminal $300_1$ of the user who is currently logged in the data sharing system 10. That is, the communication terminal $300_1$ is a communication terminal to transmit the re-encryption key. It is assumed that none of the communication terminals $300_1$, $300_2$, $300_3$ and $300_4$ has the unupdated session key SK one generation before. For example, it is assumed that all the communication terminals 300 enters a state of not holding the session key SK at a timing of all the communication terminals 300 having logged out from the data sharing system 10 once.

The secret key generation requesting part 360 of the communication terminal $300_1$ generates a secret key generation request and transmits the secret key generation request to the key generation server 200 together with the generation identifier gID recorded in the recording part 390 (S410).

When the key generation server 200 receives the secret key generation request using the transmitting/receiving part 280, the secret key generating part 220 of the key generation server 200 generates a secret key $d_{gID}$ for the generation identifier gID by the algorithm Keygen(params, msk, gID) with the set of the public parameter and the master secret key (params, msk) recorded in the recording part 290 and the generation identifier gID as an input (S420). The key managing part 205 of the key generation server 200 records the secret key $d_{gID}$ to the recording part 290.

The key generation server 200 transmits the secret key $d_{gID}$ generated at S420 to the communication terminal $300_1$ using the transmitting/receiving part 280 (S430).

When the communication terminal $300_1$ receives the secret key $d_{gID}$ using the transmitting/receiving part 380, the secret key managing part 363 of the communication terminal $300_1$ records the secret key $d_{gID}$ to the recording part 390 (S440).

The encrypted session key acquisition requesting part 365 of the communication terminal $300_1$ generates an encrypted session key acquisition request and transmits the encrypted session key acquisition request to the data sharing server 100 (S450).

When the data sharing server 100 receives the encrypted session key acquisition request using the transmitting/receiving part 180, the encrypted session key transmitting part 120 of the data sharing server 100 transmits the encrypted session key $C_{SK}$ recorded in the recording part 190 to the communication terminal $300_1$ (S460).

When the communication terminal $300_1$ receives the encrypted session key $C_{SK}$ using the transmitting/receiving part 380, the session key decrypting part 370 of the communication terminal $300_1$ acquires the session key SK by the algorithm Dec(params, $d_{gID}$, $C_{SK}$) with the public parameter params and the secret key $d_{gID}$ recorded in the recording part 390 and the encrypted session key $C_{SK}$ as an input (S470).

The re-encrypted key generating part 375 of the communication terminal $300_1$ generates a re-encryption key $f_{k1}$(SK, SK'), which is an operation result by the function $f_{k1}$, from the session key SK acquired at S470 and the session key SK' (S480).

The communication terminal $300_1$ transmits the re-encryption key $f_{k1}$(SK, SK') generated at S480 to the data sharing server 100 using the transmitting/receiving part 380 (S490).

When the data sharing server 100 receives the re-encryption key $f_{k1}$(SK, SK') using the transmitting/receiving part 180, the re-encrypting part 130 of the data sharing server 100 generates an operation result key $g_{k1}(f_{k1}(K, SK), f_{k1}(SK, SK'))=f_{k1}(K, SK')$ by the function $g_{k1}$ from the operation result key $f_{k1}$(K, SK), which is an element of the cryptograph ($C_m$, $f_{k1}$(K, SK)) recorded in the recording part 190, and the re-encryption key $f_{k1}$(SK, SK') and generates cryptograph ($C_m$, $f_{k1}$(K, SK')) using the operation result key $f_{k1}$(K, SK'). The cryptograph managing part 117 of the data sharing server 100 records the cryptograph ($C_m$, $f_{k1}$(K, SK')) to the recording part 190 (S495).

[Session Key Encryption Process Accompanying Deletion of User]

Figure 9:
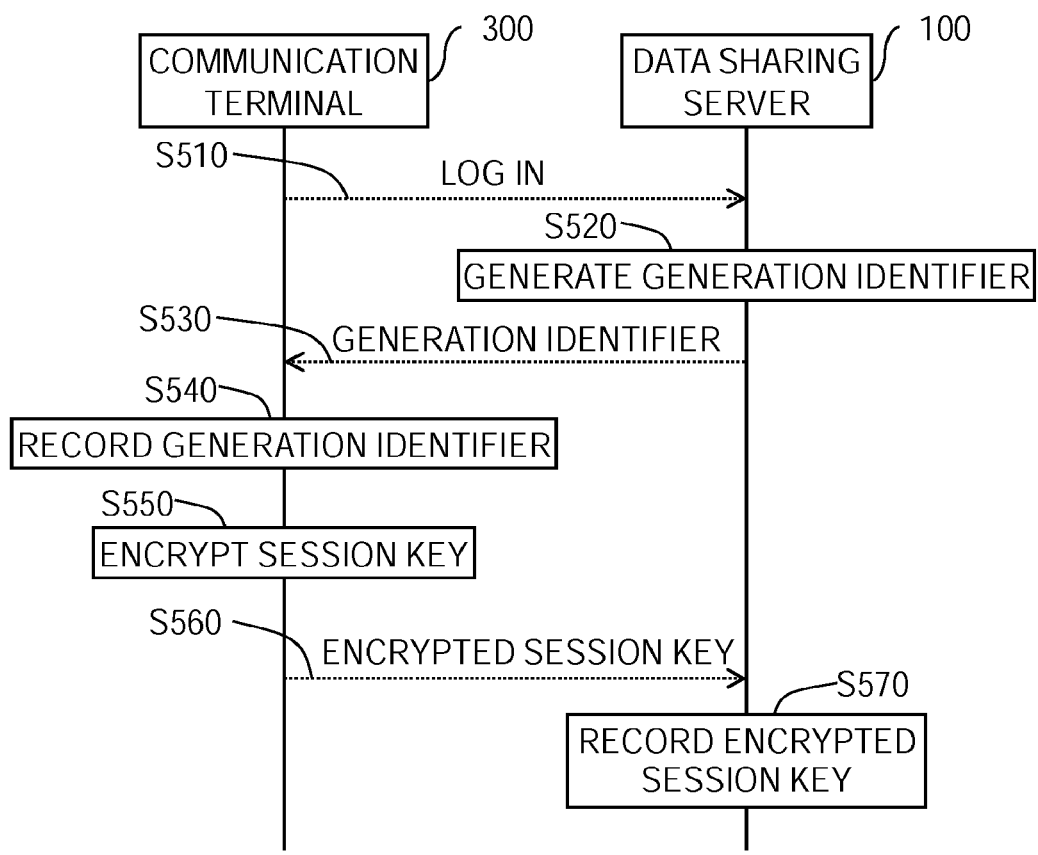
FIG. 9 is a sequence diagram showing an example of a session key encryption process accompanying deletion of a user.

The second and subsequent timings to generate a generation identifier (that is, timings to update a generation identifier) are, for example, timings when one of users composing a group logs in the data sharing system 10 after one of the users composing the group is deleted from (leaves) the group. At this time, the encrypted session key recorded in the data sharing server 100 is updated. A session key encryption process accompanying deletion of a user will be described below with reference to FIG. 9. It is assumed that the encrypted session key $C_{SK}$ is recorded in the recording part 190 of the data sharing server 100. It is assumed that the user deleted from the group is D. It is assumed that a communication terminal 300 to encrypt a currently valid session key is, for example, the communication terminal $300_1$ of the user A who is currently logged in the data sharing system 10. That is, the communication terminal $300_1$ is a communication terminal to perform encrypted session key update. It is assumed that the currently valid session key is SK". This session key SK" is recorded in the recording part 390 of the communication terminal $300_1$.

When the user A logs in the data sharing system 10 using the communication terminal $300_1$ (S510), the generation identifier generating part 110 of the data sharing server 100 generates a generation identifier gID' (S520). It is assumed that the generation identifier gID' is a character string groupID||del-time obtained by coupling the group identifier groupID and time del-time at which the user D is deleted from the group. The generation identifier is not limited thereto. For example, a random number is possible. The group information managing part 105 of the data sharing server 100 records the generation identifier gID' to the recording part 190 in a form of updating the generation identifier. That is, the group information managing part 105 deletes the generation identifier gID one generation before and records the currently valid generation identifier gID'.

The data sharing server 100 transmits the generation identifier gID' generated at S520 to the communication terminal $300_1$ using the transmitting/receiving part 180 (S530).

When the communication terminal $300_1$ receives the generation identifier gID' using the transmitting/receiving part 380, the group information managing part 305 of the communication terminal $300_1$ records the generation identifier gID' to the recording part 390 (S540). It is assumed that this generation identifier gID' is transmitted when a user other than the user A (the user B or C) constituting the group having the group identifier groupID logs in the data sharing system 10 using a communication terminal 300, from the data sharing server 100 to the communication terminal 300, and the communication terminal 300 records the received generation identifier gID' to the recording part 390.

The session key encrypting part 310 of the communication terminal $300_1$ generates an encrypted session key $C_{SK''}$, which is the session key SK" that has been encrypted, by Enc(params, gID', SK"), with the public parameter params, the generation identifier gID' and the session key SK" as an input (S550).

The communication terminal $300_1$ transmits the encrypted session key $C_{SK''}$ generated at S550 to the data sharing server 100 using the transmitting/receiving part 380 (S560).

When the data sharing server 100 receives the encrypted session key $C_{SK''}$ using the transmitting/receiving part 180, the encrypted session key managing part 115 of the data sharing server 100 records the encrypted session key $C_{SK''}$ to the recording part 190 as a currently valid encrypted session key (S570). Note that it is preferable to delete the encrypted session key $C_{SK'}$, which is the session key one generation before that has been encrypted, at that time.

At this time point, since the user D deleted from the group cannot know the current secret key $d_{gID''}$ though he may know the secret key $d_{gID}$ one generation before, he cannot decrypt the encrypted session key $C_{SK''}$ recorded in the data sharing server 100 afterward.

According to the present embodiment, a user deleted from a group performing data sharing cannot decrypt data decryptable on the communication terminal side, which is data stored in a server before and has been updated using an updated session key without being decrypted on the server side.

<Supplementary Notes>

For example, as a single hardware entity, an apparatus of the present invention has an inputting part to which a keyboard and the like can be connected, an outputting part to which a liquid crystal display or the like can be connected, a communicating part to which a communication device (for example, a communication cable) communicable to the outside of the hardware entity can be connected, a CPU (Central Processing Unit, which may be provided with a cache memory, a register and the like), a RAM and a ROM which are memories, an external storage device which is a hard disk, and a bus connecting the inputting part, the outputting part, the communicating part, the CPU, the RAM, the ROM and the external storage device to enable data exchange among them. Further, the hardware entity may be provided with a device (a drive) or the like capable of reading from/writing to a recording medium such as a CD-ROM. As a physical entity provided with such hardware resources, a general-purpose computer or the like can be given.

In the external storage device of the hardware entity, programs required to realize the functions described above and data and the like required for processing of the programs are stored. (The storage is not limited to an external storage device. For example, the programs may be stored in the ROM which is a read-only storage device). Data and the like obtained by processing of the programs are appropriately stored in the RAM or the external storage device.

In the hardware entity, each program stored in the external storage device (or the ROM or the like) and data required for processing of the program are read into the memory as necessary, and interpretation, execution and processing are appropriately performed by the CPU. As a result, the CPU realizes predetermined functions (each of the components represented above as . . . part, . . . means or the like).

The present invention is not limited to the above embodiment but can be appropriately changed within a range not departing from the spirit of the present invention. Further, the processes described in the above embodiment are not only executed in time series in order of the description but also may be executed in parallel or individually according to the processing capability of the apparatus that executes the processes or as necessary.

In the case of realizing the processing functions of the hardware entity (the apparatus of the present invention) described in the above embodiment by a computer as already stated, processing content of the functions that the hardware entity should have is written by a program. Then, by executing the program on the computer, the processing functions of the hardware entity are realized on the computer.

The program in which the processing content is written can be recorded in a computer-readable recording medium. As the computer-readable recording medium, anything is possible, for example, a magnetic recording device, an optical disk, a magneto-optical recording medium or a semiconductor memory. Specifically, for example, a hard disk device, a flexible disk, a magnetic tape or the like can be used as the magnetic recording device; a DVD (Digital Versatile Disc), a DVD-RAM (Random Access Memory), a CD-ROM (Compact Disc Read Only Memory), a CD-R (Recordable)/RW (ReWritable) or the like can be used as the optical disk; an MO (Magneto-Optical disc) or the like can be used as the magneto-optical recording medium; and an EEP-ROM (Electronically Erasable and Programmable-Read Only Memory) or the like can be used as the semiconductor memory.

Distribution of the program is performed, for example, by performing sales, transfer, lending or the like of a portable recording medium, such as a DVD or a CD-ROM, in which the program is recorded. Furthermore, a configuration is also possible in which this program is stored in a storage device of a server computer, and is distributed by being transferred from the server computer to other computers via a network.

For example, a computer that executes such a program first stores the program recorded in a portable recording medium or transferred from a server computer into its own storage device once. Then, at the time of executing processing, the computer reads the program stored in its own storage device and executes the processing according to the read program. Further, as another execution form of this program, a computer may directly read the program from a portable recording medium and execute processing according to the program. Furthermore, each time a program is transferred to the computer from a sever computer, the computer may sequentially execute processing according to the received program. Further, a configuration is also possible in which the above processing is executed by a so-called ASP (Application Service Provider) type service in which, without transferring the program from the server computer to the computer, the processing functions are realized only by an instruction to execute the program and acquisition of a result. It is assumed that the program in this form includes information which is provided for processing by an electronic calculator and is equivalent to a program (data or the like which is not a direct command to the computer but has a nature of specifying processing of the computer).

Further, though it is assumed in this form that a hardware entity is configured by causing a predetermined program to be executed on a computer, at least a part of the processing content may be realized as hardware.

The above description of the embodiment of the present invention is presented for the purpose of illustration and description. The description is neither intended to be comprehensive nor intended to limit the invention to the disclosed strict form. Modifications and variations are possible from the above teaching. The embodiment is selected and expressed in order to provide the best illustration of the principle of the present invention and in order that those skilled in the art can utilize the present invention in various embodiments or by adding various modifications so that the present invention is suitable for carefully considered practical use. All such modifications and variations are within the scope of the present invention specified by accompanying claims interpreted within a range given fairly, legally and justly.

What is claimed is:

1. A data sharing method for, in a data sharing system comprising n communication terminals (n is an integer larger than 1) sharing data, a data sharing server recording encrypted data obtained by encrypting the data and a key generation server generating a public parameter, updating an encrypted session key obtained by encrypting a session key shared among the communication terminals sharing the data when a user using any of the n communication terminals leaves a group composed of users using the n communication terminals, in order that the user who has left the group cannot decrypt the encrypted data, wherein
    any of n−1 communication terminals except the communication terminal used by the user who has left the group is used as a communication terminal to perform encrypted session key update;
    in a recording part of the communication terminal to perform encrypted session key update, the public parameter and a currently valid session key are recorded; and
    the data sharing method comprises:
    a generation identifier generation step of the data sharing server generating a generation identifier showing a generation of the group;
    a session key encryption step of the communication terminal to perform encrypted session key update using the generation identifier received from the data sharing server and the public parameter and the session key recorded in the recording part to generate an encrypted session key, which is the session key that has been encrypted; and
    an encrypted session key management step of the data sharing server recording the encrypted session key received from the communication terminal to perform encrypted session key update as a currently valid encrypted session key.

2. A data sharing system comprising n communication terminals (n is an integer larger than 1) sharing data, a data sharing server recording encrypted data obtained by encrypting the data and a key generation server generating a public parameter, the data sharing system updating an encrypted session key obtained by encrypting a session key shared among the communication terminals sharing the data when a user using any of the n communication terminals leaves a group composed of users using the n communication terminals, in order that the user who has left the group cannot decrypt the encrypted data, wherein
    any of n−1 communication terminals except the communication terminal used by the user who has left the group is used as a communication terminal to perform encrypted session key update;
    the data sharing server comprises:
    processing circuitry configured to
    generate a generation identifier showing a generation of the group; and
    record an encrypted session key received from the communication terminal to perform encrypted session key update as a currently valid encrypted session key; and
    the communication terminal to perform encrypted session key update comprises:
    processing circuitry configured to
    record the public parameter and a currently valid session key; and
    use the generation identifier received from the data sharing server and the public parameter and the session key recorded in the recording part to generate an encrypted session key, which is the session key that has been encrypted.

3. A communication terminal included in a data sharing system, the data sharing system comprising n communication terminals (n is an integer larger than 1) sharing data, a data sharing server recording encrypted data obtained by encrypting the data and a key generation server generating a public parameter, and the data sharing system updating an encrypted session key obtained by encrypting a session key shared among the communication terminals sharing the data when a user using any of the n communication terminals leaves a group composed of users using the n communication terminals, in order that the user who has left the group cannot decrypt the encrypted data, wherein
    the communication terminal is any of n−1 communication terminals except the communication terminal used by the user who has left the group, the terminal performing encrypted session key update; and
    the communication terminal comprises:
    processing circuitry configured to
    record the public parameter and a currently valid session key; and
    use a generation identifier received from the data sharing server and the public parameter and the session key recorded in the recording part to generate an encrypted session key, which is the session key that has been encrypted.

4. A non-transitory computer readable medium that stores a program for causing a computer to function as the communication terminal according to claim 3.

\* \* \* \* \*